June 7, 1932. T. W. MORGAN 1,862,415
COLLAPSIBLE DEMOUNTABLE TIRE RIM
Filed March 24, 1930 3 Sheets-Sheet 1

INVENTOR:
Toney W. Morgan.
BY
ATTORNEY.

June 7, 1932. T. W. MORGAN 1,862,415
COLLAPSIBLE DEMOUNTABLE TIRE RIM
Filed March 24, 1930 3 Sheets-Sheet 2

INVENTOR:
Toney W. Morgan.
BY
ATTORNEY.

June 7, 1932. T. W. MORGAN 1,862,415
COLLAPSIBLE DEMOUNTABLE TIRE RIM
Filed March 24, 1930 3 Sheets-Sheet 3
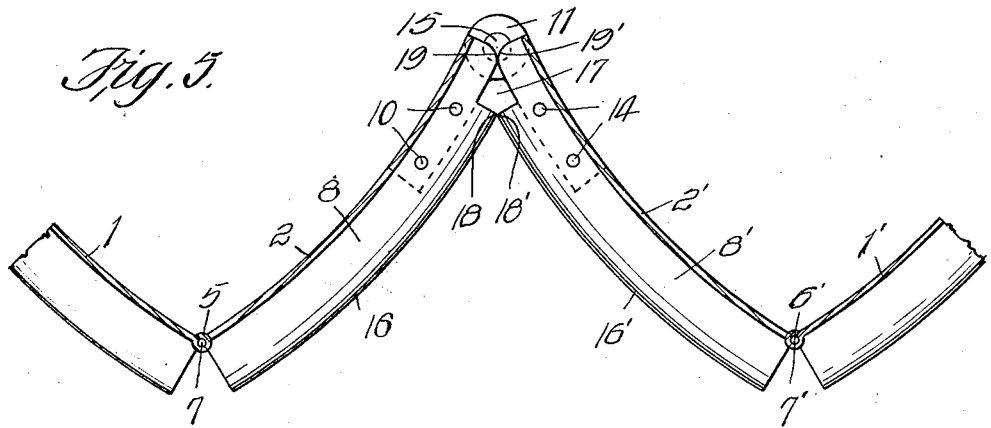
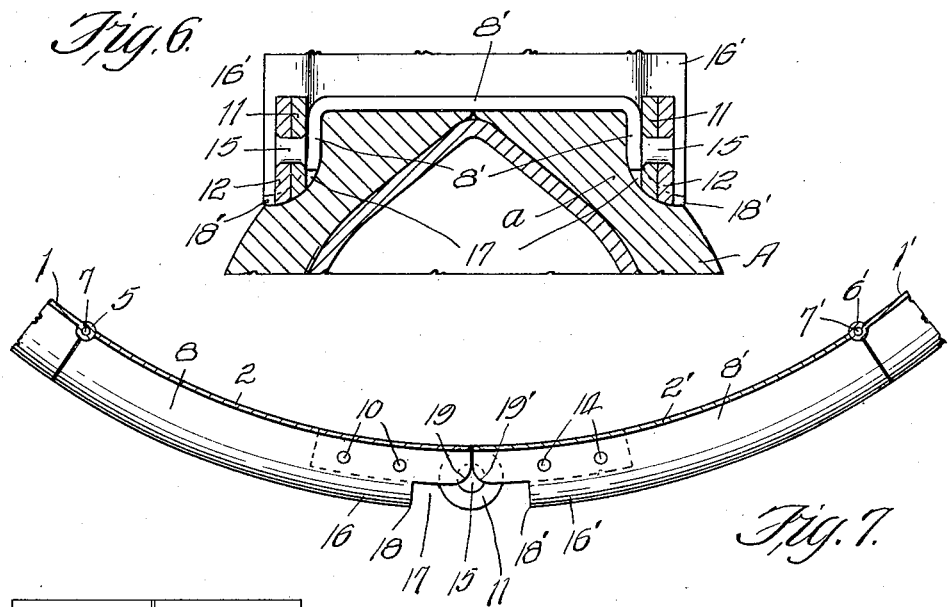
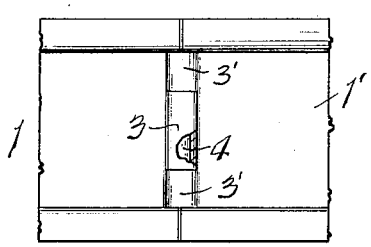
INVENTOR:
Toney W. Morgan,
BY
ATTORNEY.

Patented June 7, 1932                                                          1,862,415

UNITED STATES PATENT OFFICE

TONEY W. MORGAN, OF ST. LOUIS, MISSOURI, ASSIGNOR OF ONE-THIRD TO WILLIAM BOSTON, AND ONE-THIRD TO DAVID L. GOLDBERG, BOTH OF ST. LOUIS, MISSOURI

COLLAPSIBLE DEMOUNTABLE TIRE RIM

Application filed March 24, 1930. Serial No. 438,407.

My invention relates to collapsible demountable tire carrying rims for automobile and like wheels.

The object of my invention is the provision of a tire carrying rim embodying a plurality of permanently hinged rim sections, two of which sections when in broken relation, permit contracting of the rim diametrically so as to assume a non-circular formation to such an extent as to permit of its easy application to, or removal from a tire casing without the aid of tools of any kind.

A still further object of the invention is the provision of a collapsible demountable tire rim which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claim hereto appended.

Referring to the accompanying drawings forming a part of this specification, wherein like characters of reference denote similar parts throughout the several views:

Fig. 5 is a longitudinal sectional view taken on line 5—5 of Fig. 4.

Fig. 6 is an enlarged transverse sectional elevation taken through the hinge joint connecting the inner ends of the auxiliary rim sections.

Fig. 7 is a longitudinal sectional view taken on line 7—7 of Fig. 2.

Fig. 8 is a plan view of a portion of the main rim sections showing the hinge joint connecting the same.

Figure 1:
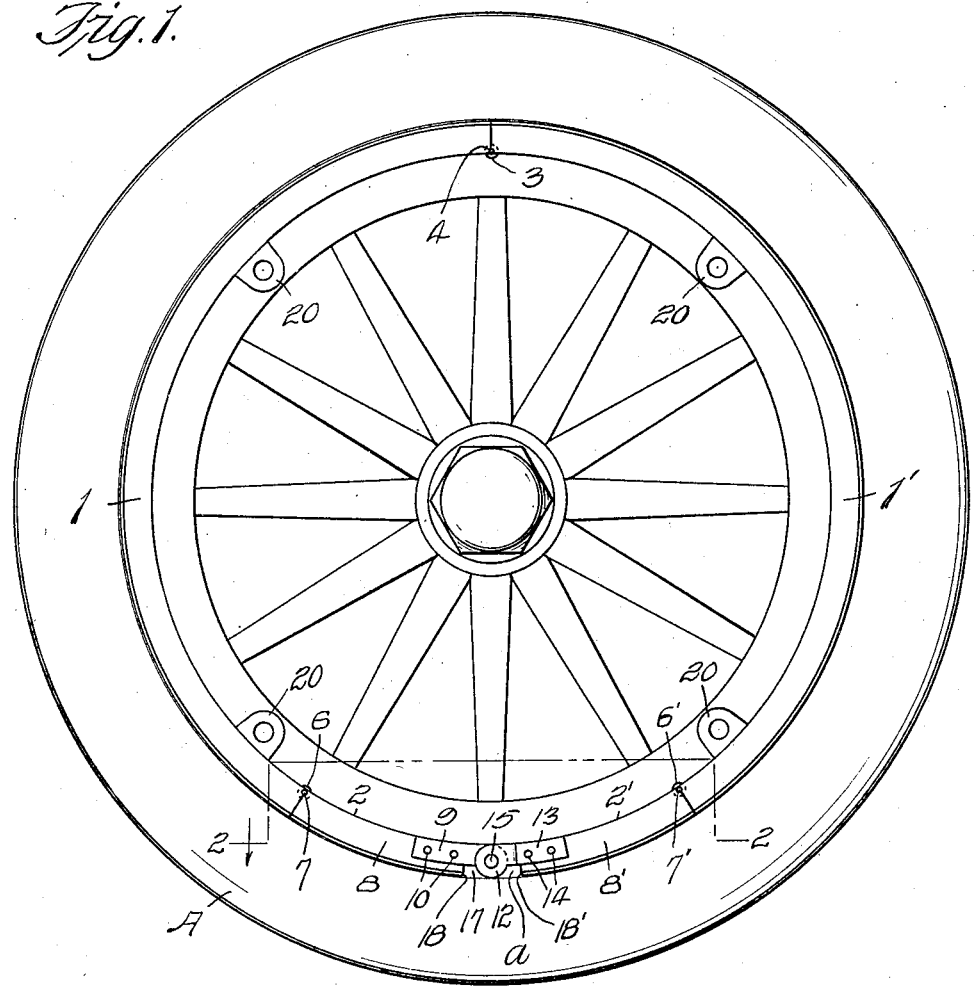
Fig. 1 is a side elevation of a collapsible demountable tire rim in accordance with my invention and shown as applied in expanded position to a tire.
Figure 3:
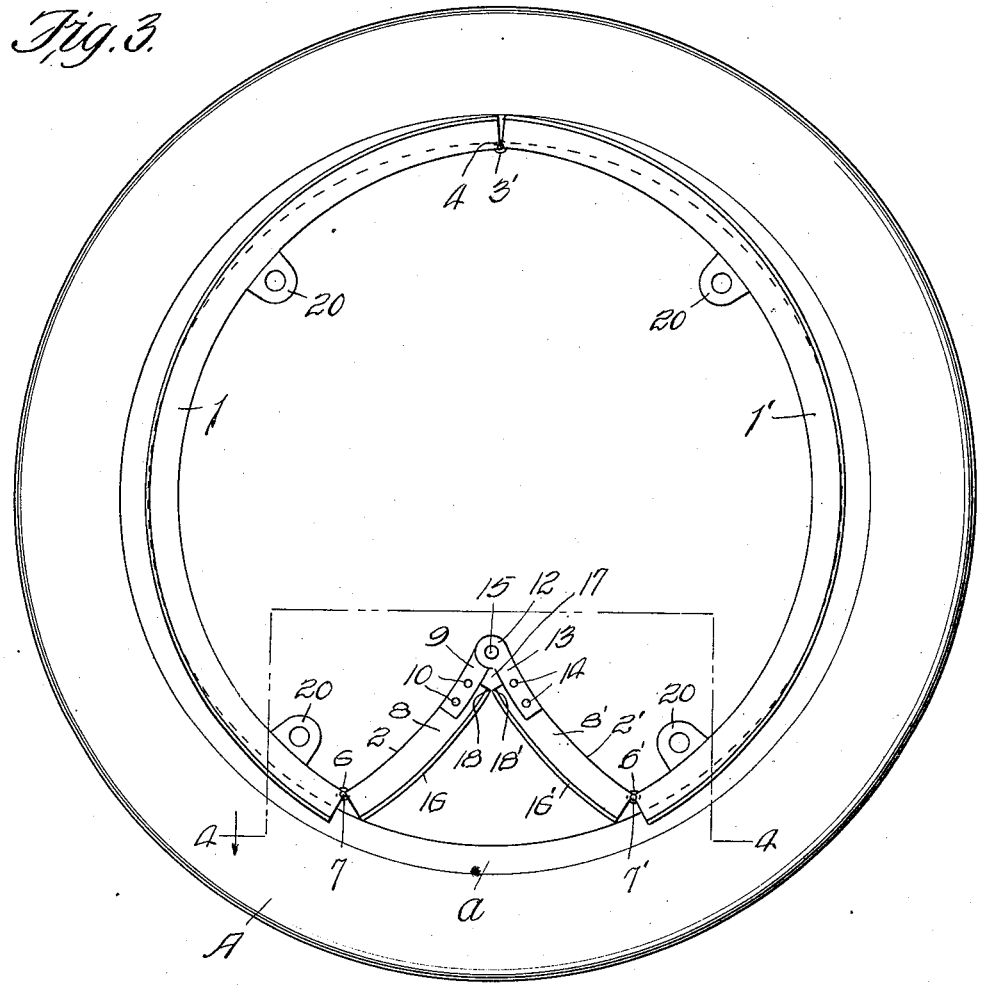
Fig. 3 is a side elevation of my improved rim shown in its contracted or collapsed position relative to the tire mounted thereon.

Referring to Figs. 1 and 3, the reference character A designates a tire casing of the type having the usual beads $a$, along its side edges.

In accordance with my invention, the tire carrying rim, as a whole, comprises a pair of like main rim sections designated 1 and 1' and a pair of relatively short auxiliary rim sections 2 and 2'.

The main rim sections 1 and 1' are hingedly connected at one end by means of a hinge joint formed integral with the rim by providing the rim section 1 with the knuckle 3 interengaged with a pair of knuckles 3' and a pivot pin 4 passing through the aligned knuckles, as will be apparent from Fig. 8. The knuckles, by preference, project radially inward and outward, so as to lie equally on opposite sides of the base of the rim, as will be apparent from Figs. 1 and 3.

Figure 2:
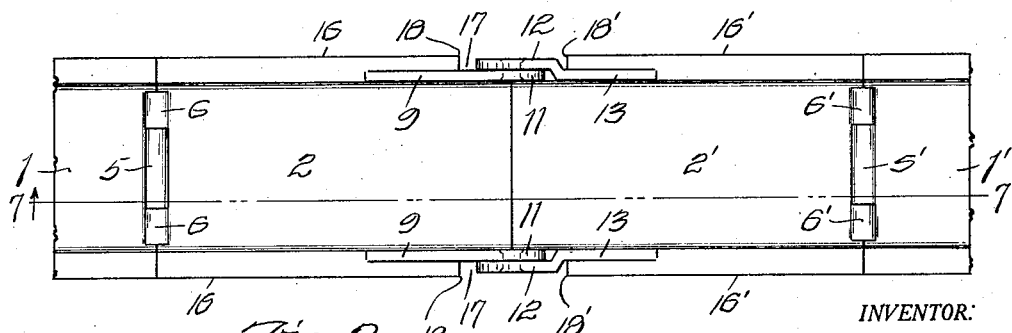
Fig. 2 is an enlarged plan view of a portion of the rim taken on line 2—2 of Fig. 1, looking in the direction of the arrow.
Figure 4:
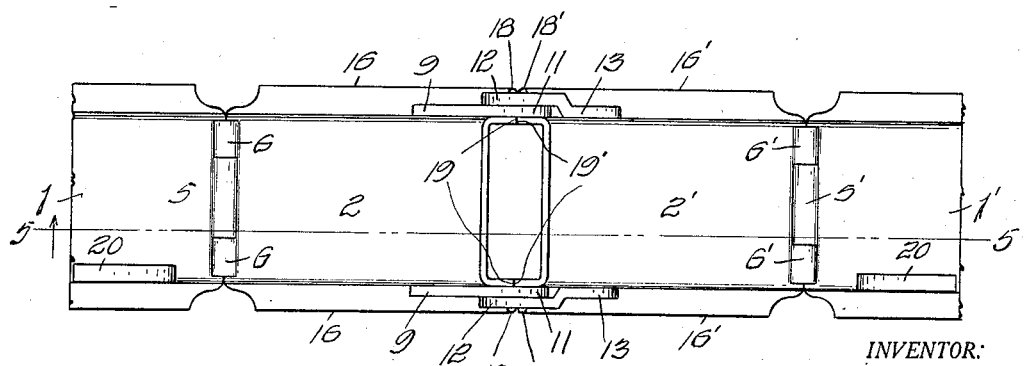
Fig. 4 is an enlarged plan view of a portion of the rim taken on line 4—4 of Fig. 3, looking in the direction of the arrow.

The outer ends of the relatively short auxiliary rim sections 2 and 2' are hingedly connected at their outer ends by means of hinge joints formed integral with the rim by providing the main rim sections 1 and 1' with a knuckle 5 and 5' respectively, interengaged with knuckles 6 and 6' respectively, formed at the outer end of the auxiliary rim sections 2 and 2', respectively, and the pivot pins 7 and 7' passing through the aligned knuckles 5 and 6 and 5' and 6', respectively, as will be apparent from Figs. 2 and 4. These knuckles, by preference, project radially inwardly and outwardly, so as to lie equally on opposite sides of the rim sections, as will be apparent from Fig. 7.

The inner ends of the auxiliary rim sections 2 and 2' are hingedly connected by means of a pair of side strap hinges applied to flanged walls 8 and 8' of the auxiliary rim sections. These hinges each comprise a pair of straight straps 9 riveted to the outer faces of the flanges of the auxiliary rim section 2, as at 10, the heads 11 of which straps 9 are engaged by the offset heads 12 of a pair of straps 13, which straps 13 are riveted as at 14, to the outer faces of the flanges 8' of the auxiliary rim sections 2'. The heads of the two sets of strap hinges are connected by means of the aligned pivot pin 15.

The inner ends of the curved portions 16 and 16' of the flanges of the auxiliary rims 2 and 2', respectively, are cut back a suitable distance to provide gaps 17 to receive the heads of the hinge straps when the rim is in its expanded position, as shown in Figs. 6 and 7 and to permit the auxiliary rim sections to break and assume an angular position to each other when the rim is collapsed, as shown in Fig. 5.

The corners 18 and 18' of the curved portions 16 and 16' respectively of the flanges of the auxiliary rim sections 2 and 2', respectively, are adapted to contact with each other when the rim has been fully collapsed and they act as stops to limit the collapsing movement of the rim, as shown in Fig. 5. The auxiliary rim sections 2 and 2' act as toggle arms when moved toward the center of the rim for pulling the abutting ends of the main rim sections connected therewith away from the tire A when collapsing the rim, thus permitting easy removal of the tire from the rim, or vice versa, due to the changing of the diameter of the rim by contracting or collapsing the same.

The inner end of the flange walls of the auxiliary rim sections 2 and 2' have their outer corners curved, as at 19 and 19', respectively, as will be apparent from Figs. 5 and 7 so as to permit inward movement of the inner ends of the auxiliary rim sections until the rim flange corners 16 and 16' contact to provide a stop limiting further breaking movement of the auxiliary rim sections.

The main sections 1 and 1' of the rim are provided with the usual lugs 20 for connecting the rim to a wheel felly by means of the usual bolts and nuts, not shown.

To apply the rim to a tire, the same is collapsed by moving the auxiliary rim sections into the position shown in Figs. 3 and 5 which reduces the rim in size diametrically. It is then placed within the tire opening and then foot pressure is applied to the inner ends of the auxiliary rim sections for forcing them outwardly for expanding the rim into normal size for contact with the tire.

To remove the rim from a tire, the operator merely lifts the tire and rim up with the auxiliary rim sections positioned at the bottom and then drop the tire and rim under force to the ground which will cause the auxiliary rim sections to break sufficiently for the operator to pull the auxiliary rim sections toward the center of the rim as far as they will go which pulls the main rim sections away from the tire sufficient to easily and readily remove the rim from the tire, or the tire from the rim by means of the hands without the aid of tools of any character.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claim.

What I claim is:

The combination of a demountable tire rim having two main sections hingedly connected and two auxiliary sections each hingedly connected at one end to the adjoining ends of the main sections, of a straight flat hinge strap fixed to the flanges on each side of one of the auxiliary sections and extending beyond the inner end edge of the auxiliary section and provided at its extended end with a head having a central opening and a curved periphery, an off-set hinge strap fixed to the flanges on each side of the other auxiliary section and provided at its inner end edge with a head having a central opening and a curved periphery, a rivet receivable in the central openings of each pair of hinge straps acting as a hinge pin for each pair of hinge straps disposed on opposite sides of the auxiliary sections, the side flange of each auxiliary section adjacent the inner end edges of the auxiliary sections being cut away to provide recesses for the reception of the heads of the hinge straps, the corners of the auxiliary sections adjacent the inner ends of the hinge pins being curved for riding contact adjacent the inner ends of the hinge pins when collapsing the auxiliary sections and the angular corners of the flanges of the auxiliary sections formed remote from the curved corners by cutting cutaway portions of the flanges adapted to act as stops for the auxiliary sections when collapsing said sections to limit the collapsing movement thereof.

In testimony whereof, I have hereunto affixed my signature.

TONEY W. MORGAN.